(12) United States Patent
Liu et al.

(10) Patent No.: US 11,782,867 B2
(45) Date of Patent: Oct. 10, 2023

(54) METHOD TO IMPROVE COMMUNICATION SPEED IN EXISTING CONTROL SYSTEM

(71) Applicant: Honeywell International Inc., Charlotte, NC (US)

(72) Inventors: Dongxu Liu, Shanghai (CN); Jie Lv, Shanghai (CN); Yongquan Tan, Shanghai (CN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/651,588

(22) Filed: Feb. 18, 2022

(65) Prior Publication Data

US 2023/0267093 A1 Aug. 24, 2023

(51) Int. Cl.
*G06F 13/20* (2006.01)
*G06F 13/42* (2006.01)
*G06F 13/16* (2006.01)

(52) U.S. Cl.
CPC ...... *G06F 13/4282* (2013.01); *G06F 13/1673* (2013.01); *G06F 13/4221* (2013.01)

(58) Field of Classification Search
None
See application file for complete search history.

(56) References Cited

U.S. PATENT DOCUMENTS

| | | | |
|---|---|---|---|
| 2004/0143380 A1* | 7/2004 | Stam | G06V 20/584 340/467 |
| 2009/0284268 A1* | 11/2009 | Burt | G06F 11/2733 324/555 |
| 2013/0099830 A1* | 4/2013 | Oh | H03K 19/017509 327/108 |
| 2017/0315947 A1* | 11/2017 | Andrews | G06F 13/4031 |
| 2021/0176413 A1* | 6/2021 | Inoue | H04N 25/709 |

FOREIGN PATENT DOCUMENTS

| | | |
|---|---|---|
| CN | 2487171 Y | 4/2002 |
| CN | 210351129 U | 4/2020 |
| CN | 214228268 U | 9/2021 |
| WO | 2017083047 A1 | 5/2017 |

OTHER PUBLICATIONS

TIDA-060017, Transmitting SPI Signals Over LVDS Interface Reference Design, Texas Instruments, Retrieved from: https://www.ti.com/tool/TIDA-060017, Retreived on: Nov. 2, 2021 (6 pages total).

* cited by examiner

*Primary Examiner* — Henry Tsai
*Assistant Examiner* — Dean Phan
(74) *Attorney, Agent, or Firm* — John Maldjian; Stevens & Lee PC

(57) ABSTRACT

A system includes a serial peripheral interface (SPI) buffer configured at an initial position. A low voltage differential signaling (LVDS) transceiver is configured above the SPI buffer. A capacitor couples the LVDS transceiver with the SPI buffer. The SPI buffer does not interfere with signals from the LVDS transceiver. The LVDS transceiver does not interfere with signals from the SPI buffer. An input/output (I/O) module receives a signal from the LVDS transceiver or the SPI buffer.

19 Claims, 5 Drawing Sheets

METHOD TO IMPROVE COMMUNICATION SPEED IN EXISTING CONTROL SYSTEM

TECHNICAL FIELD

The present disclosure generally relates to high-speed differential signals coupled to low-speed single-ended signal lines, wherein the differential signals and single-ended signals share one hardware interface.

BACKGROUND

In the industrial field, the life cycle of a control system is typically twenty years or more. As such, the hardware design from twenty years ago or more may not be able to meet the latest customer demand or requirements.

One of the customer demands is the communication speed between the controller and the IO (input/output) module. The communication speed between the controller and I/O module can be a major bottleneck or problem restricting the improvement of the system's performance.

In existing systems, a single-ended signal is sued for data transfer between a controller and I/O modules. However, due to the poor anti-interference performance of single-ended signals, the maximum communication speed does not exceed twenty megabits per second (Mbps). To increase the communication speed above 20 Mbps, differential signals have to be used.

The limitation of the control system with respect to its architecture and hardware resources make it difficult or impossible to arrange single-ended signals and differential signals in one hardware. Moreover, if the control system bush is changed form a single end signal to a differential signal, it means that the hardware has to be updated.

As such, the system may need to be redesigned, which is a huge change and also would likely require a huge financial investment of money and time.

Accordingly, there is a need for a system can enable differential signals and single-ended signals to share a hardware interface. In addition, there is a need for a system that can communicate with new and old I/O m modules using either the low-speed single-ended signals or the high-speed differential signals.

SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

The aforementioned aspects and other objectives can now be achieved as described herein.

In an embodiment, a system includes a serial peripheral interface (SPI) buffer configured at an initial position. The system also includes a low voltage differential signaling (LVDS) transceiver configured above the SPI buffer. A capacitor couples the LVDS transceiver with the SPI buffer to prevent the SPI buffer from interfering with signals from the LVDS transceiver and prevent the LVDS transceiver from interfering with signals from the SPI buffer. The system also includes an input/output (I/O) module configured to receive a signal from either the LVDS transceiver or the SPI buffer.

The I/O module is an old I/O module that communicates with the SPI buffer.

The I/O module is a new I/O module that communicates with the LVDS transceiver.

The capacitor prevents a signal from the SPI buffer to damage the LVDS transceiver.

A system also includes a low voltage differential signaling (LVDS) transceiver configured at a first position. The system also includes a serial peripheral interface (SPI) buffer configured at a second position below the LVDS transceiver. The system further includes a capacitor configured to couple the LVDS transceiver to the SPI buffer. The capacitor also prevents a signal from the LVDS transceiver to reach the SPI buffer. The capacitor also prevents a signal from the SPI buffer from reaching the LVDS transceiver. The system also includes a controller configured to communicate to an input/output module using an SPI signal from the SPI buffer or an LVDS signal from the LVDS transceiver.

The SPI signal is only sued when the I/O module is an old module.

The controller disables the SPI buffer when the I/O module is a new module.

The capacitor limits a voltage amplitude transmitted by the SPI signal to the LVDS transceiver.

In an embodiment, a method includes positioning a serial peripheral interface (SPI) buffer configured at an initial position. The method also includes configuring a low voltage differential signaling (LVDS) transceiver above the SPI buffer. Further, the method includes positioning a capacitor to couple the LVDS transceiver with the SPI butter to prevent the SPI buffer from interfering with signals from the LVDS transceiver and prevent the LVDS transceiver from interfering with signals from the SPI buffer. The method also includes configuring an input/output (I/O) module to receive a signal from the SPI buffer or the LVDS transceiver.

The method includes positioning a controller to disable the SPI buffer.

The method also includes configuring a controller to disable the LVDS transceiver to communicate with an old I/O module using a signal from the SPI buffer.

The method also includes configuring a controller to communicate with a new I/O module by using a signal from the LVDS transceiver.

BRIEF DESCRIPTION OF THE FIGURES

The accompanying figures, in which like reference numerals refer to identical or functionally similar elements throughout the separate views and which are incorporated and form a part of the specification, further illustrate the present invention and, together with the detailed description of the invention, serve to explain the principles of the present invention.

Figure 1:
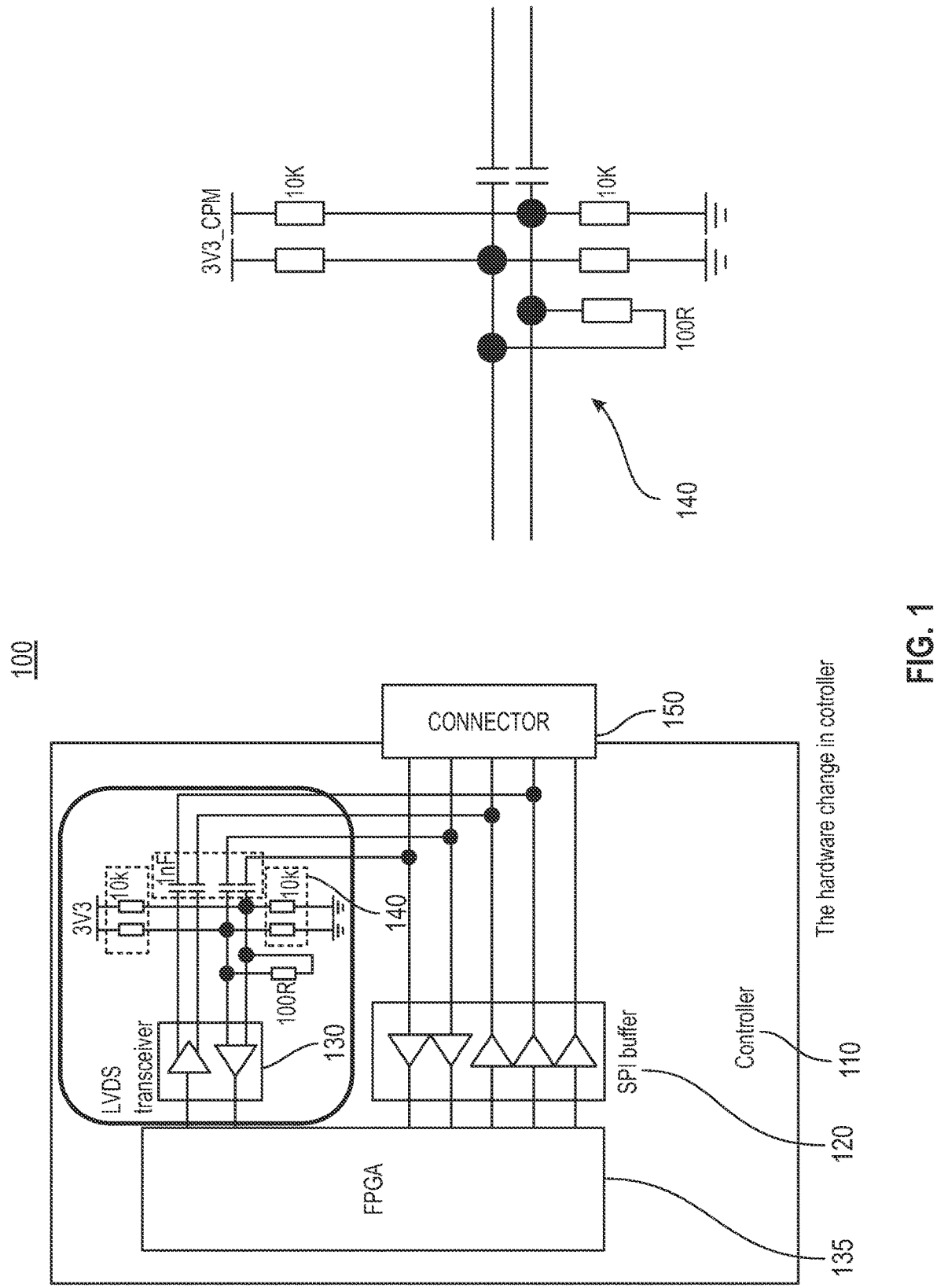
FIG. 1 illustrates a schematic diagram in accordance with an embodiment of the invention.

Unless otherwise indicated illustrations in the figures are not necessarily drawn to scale.

DETAILED DESCRIPTION OF SOME EMBODIMENTS

Background and Context

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different form and, therefore, covered or claimed subject matter is intended to be construed as not being limited to any example embodiments set forth herein, example embodiments are provided merely to be illustrative. Likewise, a reasonably broad scope for claimed or covered subject matter is intended. Among other issues, subject matter may be embodied as methods, devices, components, or systems. The followed detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as a "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

One having ordinary skill in the relevant art will readily recognize the subject matter disclosed herein can be practiced without one or more of the specific details or with other methods. In other instances, well-known structures or operations are not shown in detail to avoid obscuring certain aspects. This disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Unless defined otherwise, all technical and scientific terms used herein have the same meanings as commonly understood by one of ordinary skill in the art to which the disclosed embodiments belong. Preferred methods, techniques, devices, and materials are described, although any methods, techniques, devices, or materials similar or equivalent to those described herein may be used in the practice or testing of the present invention.

Although claims have been included in this application to specific enumerated combinations of features, it should be understood the scope of the present disclosure also includes any novel feature or any novel combination of features disclosed herein.

References "an embodiment," "example embodiment," "various embodiments," "some embodiments," etc., may indicate that the embodiment(s) so described may include a particular feature, structure, or characteristic, but not every possible embodiment necessarily includes that particular feature, structure, or characteristic.

Headings provided are for convenience and are not to be taken as limiting the present disclosure in any way.

Each term utilized herein is to be given its broadest interpretation given the context in which that term is utilized.

Terminology

The following paragraphs provide context for terms found in the present disclosure (including the claims):

The transitional term "comprising", which is synonymous with "including," "containing," or "characterized by," is inclusive or open-ended and does not exclude additional, unrecited elements or method steps. See, e.g., *Mars Inc. v. H.J. Heinz Co.*, 377 F.3d 1369, 1376, 71 USPQ2d 1837, 1843 (Fed. Cir. 2004) ("[L]ike the term 'comprising,' the terms 'containing' and 'mixture' are open-ended."). "Configured to" or "operable for" is used to connote structure by indicating that the mechanisms/units/components include structure that performs the task or tasks during operation. "Configured to" may include adapting a manufacturing process to fabricate components that are adapted to implement or perform one or more tasks.

"Based On." As used herein, this term is used to describe factors that affect a determination without otherwise precluding other or additional factors that may affect that determination. More particularly, such a determination may be solely "based on" those factors or based, at least in part, on those factors.

All terms of example language (e.g., including, without limitation, "such as", "like", "for example", "for instance", "similar to", etc.) are not exclusive of other examples and therefore mean "by way of example, and not limitation . . ."

A description of an embodiment having components in communication with each other does not infer that all enumerated components are needed.

A commercial implementation in accordance with the scope and spirit of the present disclosure may be configured according to the needs of the particular application, whereby any function of the teachings related to any described embodiment of the present invention may be suitably changed by those skilled in the art.

The flowchart and block diagrams in the figures illustrate the architecture, functionality, and operation of possible implementations of systems and methods according to various embodiments. Functions noted in the block may occur out of the order noted in the figures. For example, two blocks shown in succession may, in fact, be executed substantially concurrently, or the blocks may sometimes be executed in the reverse order, depending upon the functionality involved.

Further, any sequence of steps that may be described does not necessarily indicate a condition that the steps be performed in that order. Some steps may be performed simultaneously.

The functionality and/or the features of a particular component may be alternatively embodied by one or more other devices that are not explicitly described as having such functionality/features. Also, various embodiments of the present invention need not include a device itself.

More specifically, as will be appreciated by one skilled in the art, aspects of the present invention may be embodied as a system and/or method. Furthermore, aspects of the present invention may take the form of a plurality of systems to enable gas meter to perform self-checking to determine its overall functioning without requiring a meter operator.

Introduction

Embodiments of the present invention include a controller communicating with an I/O module using either a low-speed single ended signal or a high-speed differential signal. A hardware interface includes an LVDS transceiver and a SPI buffer that is coupled to the LVDS transceiver by a capacitor. The capacitor insures that no signals from the LVDS transceiver interfere or damage the SPI buffer, and no signals from the SPI buffer damage or interfere with the LVDS transceiver. The LVDS transceiver transmits the high-speed differential signals while the SPI buffer transmits the low-speed single ended signals. As such, the LVDS transceiver can share the same hardware interface as the SPI buffer.

The controller can communicate with an I/O module using either an SPI signal or the high-speed differential signal. When the controller communicates with the SPI signal, the controller will disable the LVDS transceiver to ensure that no high-speed differential signals interfere or entangle the low-speed single ended signal. The control will also communicate with the I/O module by using the low-speed single ended signal from the SPI buffer.

A backplane will include a differential pair of SPI traces that are compatible with either the LVDS high-speed differential signal or the low-speed single end signal. As such, the quality of either the LVDS signal or the SPI signal will not be compromised at it reaches the I/O module.

When the SPI signal is used by the controller to communicate with the I/O module, the I/O module will be an old module configured with a microcontroller unit (MCU) and an SPI buffer receiver. The controller can use the SPI signal to communicate with the old I/O module while the LVDS transceiver is disabled.

When the controller communicates with the I/O module using the high-speed differential signal, the I/O module is a new module that is inserted into a card slot with another LVDS transceiver and capacitor. The controller will use the high-speed differential signal to communicate with the new I/O module while the SPI buffer is disabled.

System Structure

FIG. 1 illustrates a system 100 of an embodiment of the invention. The system 100 includes a controller 110, an serial peripheral interface (SPI) buffer 120, low voltage differential signaling (LVDS) transceiver 130, a field-programmable gate array (FGPA) 135, a capacitor 140, and a connector 150.

In FIG. 1, The LVDS transceiver 130 is positioned above the SPI buffer 120, wherein both the LVDS transceiver 130 and the SPI buffer 120 are positioned in front of the FGPA 135. Both the LVDS transceiver 130 and the SPI buffer 120 both transmit vastly different signals. The LVDS transceiver 130 will transmit a high-speed differential signal. A differential LVDS signal can be used for up to 400 Mbps high-speed commutation. In contrast, the SPI buffer 120 will transmit a low-speed single-end signal. The maximum SPI communication speed is 8 Mbps. The capacitor 140 is positioned to prevent any low-speed single end signals from the SPI buffer 120 from interfering or crossing paths with high-speed differential signals from the INDS transceiver 130. As such, when the SPI buffer 120 is transmitting a low-speed single end signal, the LVDS transceiver 130 will be disabled to prevent, any signals from the INDS transceiver 130 from interfering with the low-speed single end signal from the SPI buffer 120. A controller will disable the LVDS transceiver 130 to enable the SPI buffer 120 to transmit the low-speed signal end signal to an I/O module.

In FIG. 1, when the LVDS transceiver 130 is transmitting a high-speed differential signal, the SPI buffer 120 will be disabled to prevent any low-speed single end signals from interfering with the high-speed differential signal from the LVDS transceiver 130. A controller will disable the SPI buffer 120 to enable the LVDS transceiver 130 to transmit a high-speed differential signal to an I/O module. Further, because the LVDS signal frequency is very high, it can directly pass the signal through the small capacitor 140 to an LVDS receiver on the I/O module. The existing controller connector signal assignment will not change. Moreover, the capacitor works 140 to enable the signals from the INDS transceiver 130 and the SPI buffer 120 to be transmitted at different intervals. As will be explained in later figures, an old I/O module will be used to received the signal from the SPI buffer 120 while a new I/O module will receive the high-speed differential signal from the LVDS transceiver 130.

Figure 2:
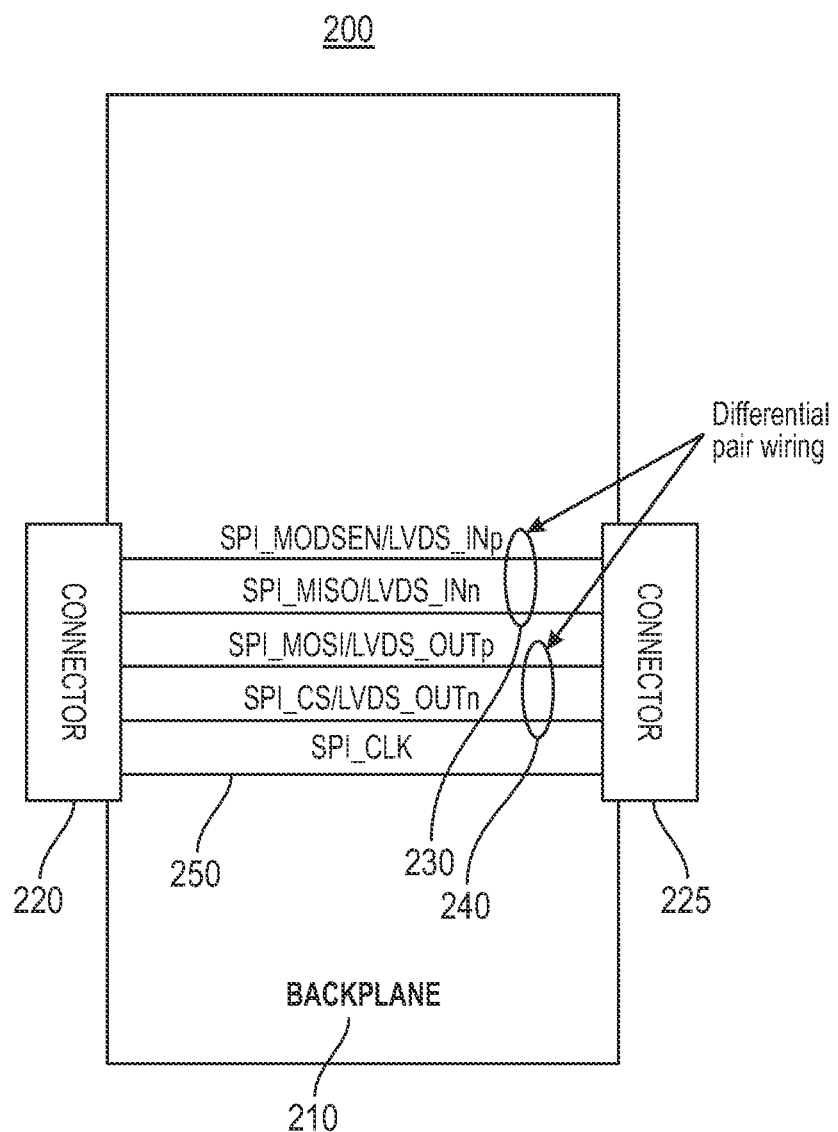
FIG. 2 illustrates another aspect of the schematic diagram in accordance with an embodiment of the invention.

Referring to FIG. 2, a system 200 illustrating a backplane 210 is shown. The backplane 210 is part of the system that will include the SPI buffer, LVDS transceiver, and the capacitor. In the backplane 210, connectors 220, 225 are shown. In between the connectors 220, 225, differential pair wiring is illustrated. More specifically, there is no hardware change on the backplane 210 and interface. The SPI traces are re-routed on the backplane 210. The SPI traces are placed as a group and routed in the form of differential pairs 230, 240. A SPI_CLK 250 is also shown. Placing the SPI traces as differential pairs 230, 240 will guarantee the LVDS signal quality to the greatest extent possible when the LVDS transceiver sends a high-speed differential signal to the I/O module. In addition, the differential pairs 230, 240 are compatible with the SPI signal transmission when the SPI buffer transmits a low-speed single end signal to the I/O module.

In FIG. 2, overall, the backplane 210 is part of the same system as the SPI buffer, capacitor, controller, LVDS transceiver, and I/O module. The backplane 210 places SPI traces into differential pairs 230, 240 to ensure that the LVDS signal quality is at a high level when the LVDS transceiver transmits a high-speed differential signal to the I/O module, In addition, the differential pairs 230, 240 with the backplane are also compatible with the SPI signal transmission when the SPI buffer transmits a low-speed single end signal to an I/O module.

In different embodiments, the controller will communicate with the I/O module using either the SPI signal or the INDS high-speed differential signal. The I/O module will be an old I/O module when the controller uses the SPI signal to communicate with the I/O module.

Figure 3:
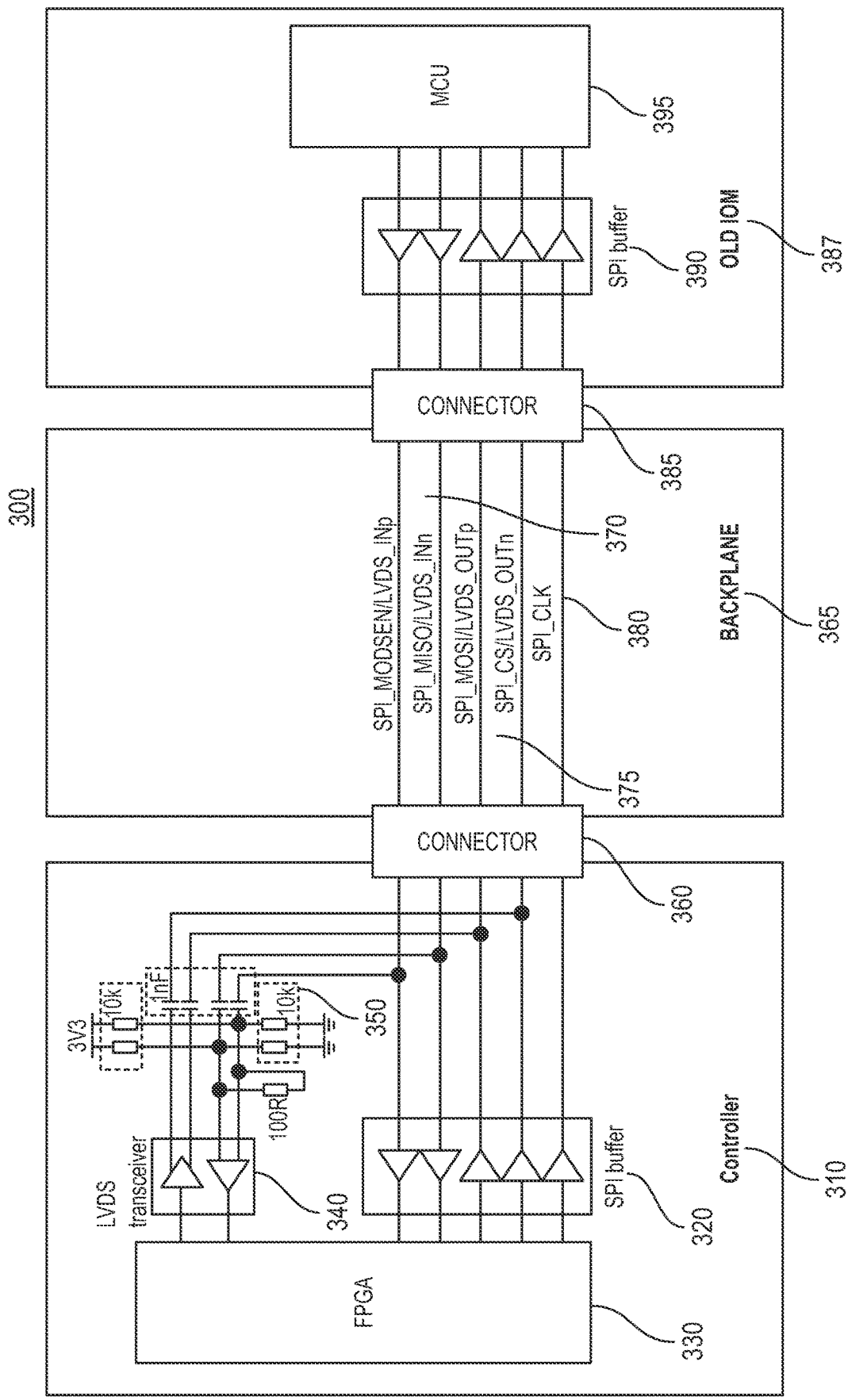
FIG. 3 illustrates a further aspect of the schematic diagram in accordance with an embodiment of the invention.

In FIG. 3, the system 300 is shown with the controller 310, SPI buffer 320, FGPA 330, LVDS transceiver 340, capacitor 350 and connector 360 is shown. In addition, the system 300 includes a backplane 365, differential pairs 370, 375, an SPI_CLK signal 380, and a connector 385. Further, the system 300 includes an old I/O module 387, SPI buffer 390, and a microcontroller unit (MCU) 395.

Referring to FIG. 3, the controller 310 will communicate with the I/O module, When an SPI signal is selected, the controller 310 will disable the LVDS transceiver 340, thereby preventing the INDS transceiver 340 from transmitting a high-speed differential signal and interfering with the SPI signal from the SPI buffer 320. When the LVDS transceiver 340 is disabled and the SPI buffer 320 is enabled, the I/O module is the old I/O module 387. Any SPI low-speed signal end signal from the SPI buffer will only be transmitted to an old I/O module and not a new I/O module. As such, the INDS transceiver 340 will not transmit a high-speed differential signal, while the SPI buffer 320 will transmit a low-speed signal end signal.

In FIG. 3, the low-speed end signal will pass through the connector 360 and backplane 365. The differential pairs 370, 375 are compatible with the low-speed single end signal from the SPI buffer. The low-speed single end signal will pass through the connector 385 and onto the I/O module. As mentioned above, the I/O module is the old module 387 as the low-speed single end signal transmitted is from the SPI buffer 320. As mentioned above, the old module 387 is used when the controller 310 communicates with the I/O module with signal from the SPI buffer 310. The old module 387 includes the other SPI buffer 390 and the MCU 395 which will receive the transmitted SPI signal from the SPI buffer 320.

With respect to FIG. 3, in summary, the controller 310 can communicate with an I/O module using an SPI signal from the SPI buffer 320. When the controller 310 is utilizing an SPI signal, the I/O module is the old module 387. The controller 310 disables the LVDS transceiver 340, wherein no high-speed differential signals will be transmitted to the old I/O module 387 or interfere with the SPI signal from the SPI buffer 320. The capacitor 350 will couple the LVDS transceiver 340 with the SPI buffer 320. The low-speed single end single will not be transmitted to the LVDS transceiver 340. The capacitor 350 will prevent the SPI signal from being transmitted to the LVDS transceiver 340. Further, the small capacitance of the capacitor 350 limits the voltage amplitude transmitted from the SPI signal to the LVDS interface, thereby ensuring that the LVDS interface chip and therefore the INDS transceiver 340 will not be damaged by the SPI signal. The SPI signal travels through the differential pairs 370, 375 within the backplane 365 and onto the old I/O module 387. As such, the controller 310 communicates with the old I/O module 387 with the SPI signal.

In another embodiment, a controller within the system will communicate with the I/O module with a high--speed differential signal from the LVDS transceiver. In such an embodiment, the capacitor will prevent the high-speed differential signal from affecting the SPI buffer. Further, the high-speed signal will pass through the differential pairs of the backplane and onto the I/O module. Further, the I/O module will be a new module.

Figure 4:
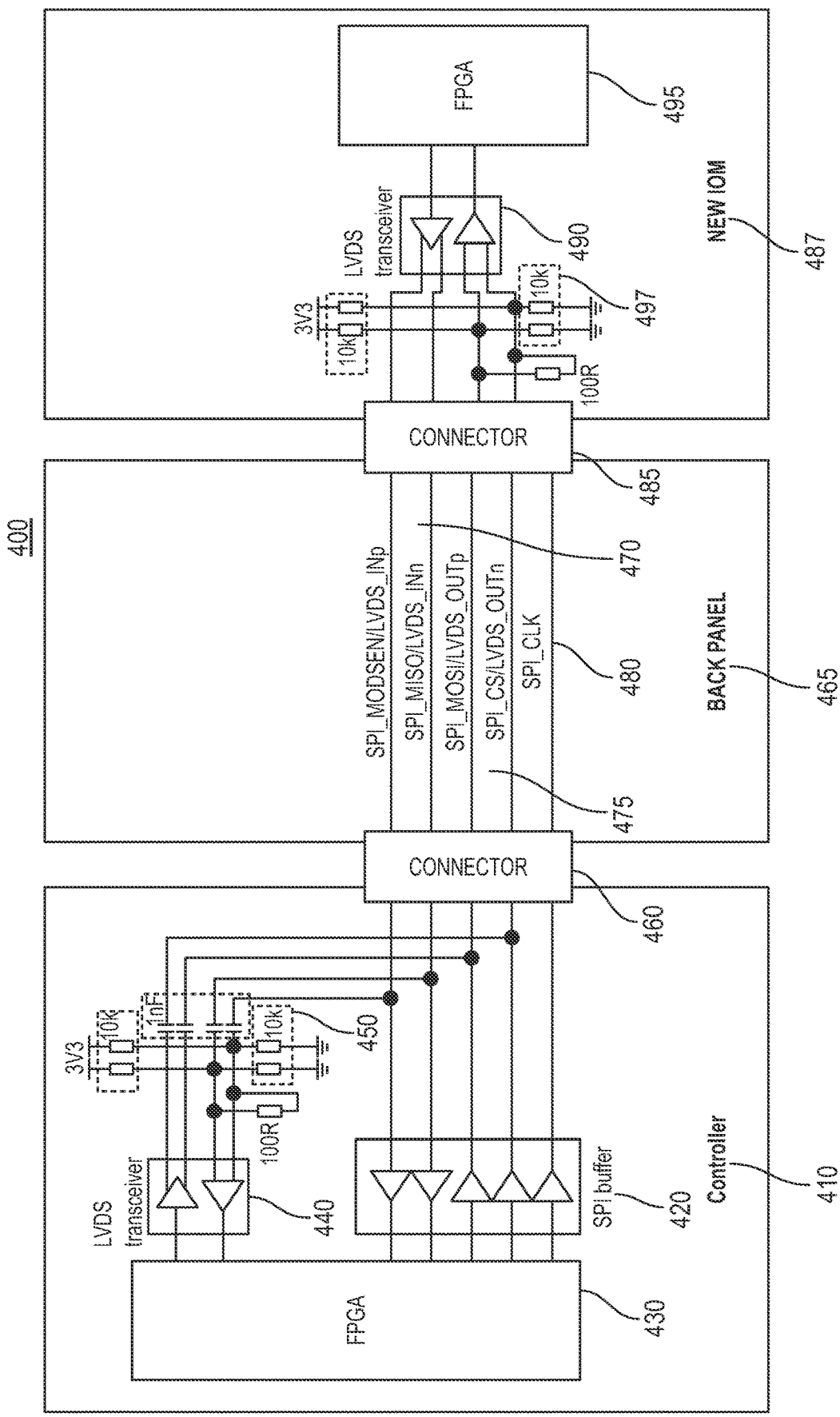
FIG. 4 illustrates another aspect of the schematic diagram in accordance with an embodiment of the invention.

In FIG. 4, an embodiment is illustrated wherein a controller communicated with an I/O module using the high-speed differential signal from the LVDS transceiver.

Referring to FIG. 4, a system 400 is illustrated. The system includes a controller 410, SPI buffer 420, FGPA 430, LVDS transceiver 440, and a capacitor 450. The system also includes a connector 460, backplane 465, differential pairs 470, 475, and a SPI_CLK signal 480. The system also includes the connector 485, the new I/O module 487, other LVDS transceiver 490, FGPA 495, and capacitor 497.

In FIG. 4, the controller 411) communicates with the new I/O module 497 using the high-speed differential signal from the LVDS transceiver 440. A newly designed I/O module 487 is inserted into the card slot with a high-speed LVDS transceiver 490. The controller 410 will disable the SPI buffer 410 and use the LVDS high-speed differential signal for high-speed data transmission with the new I/O module 487. The high-speed differential signal will travel from the LVDS transceiver 440 and onto the connector 460. The capacitor 450 will ensure that high-speed differential signal is not affected by the SPI buffer 420, and that no damage will occur to the SPI buffer 420. The capacitor 450 ensures that the high-speed differential signal does not come into contact with the SPI buffer 420. The high-speed differential signal will then pass through the backplane 465. As in FIG. 3, the backplane 465 will have differential pairs 470, 475. The differential pairs 470, 475 will guarantee the LVDS signal quality to the greatest extent possible. The LVDS high-speed signal passes through the backplane 465 and differential pairs 470, 475 and onto the connector 485. The high-speed signal will then pass onto the new I/O module 487 that includes the other LVDS transceiver 490, capacitor 497, and FGPA 495. As such, the controller 410 is able to communicate with the new I/O module 487 using the high-speed differential signal.

Referring to FIG. 4, in summary, the controller 410 communicates with the new I/O module 487 using the high-speed differential signal. A new I/O module 487 is inserted that includes a capacitor 497, LVDS transceiver 490 and FGPA 495. The high-speed differential signal travels from the LVDS transceiver 440 through the capacitor 450, connector 460, backplane 465 including the differential pairs 470, 475, connector 485, and then the new I/O module 487. As such, the controller 410 can communicate with the new I/O module 487 using the high-speed differential signal from the LVDS transceiver 440.

Figure 5:
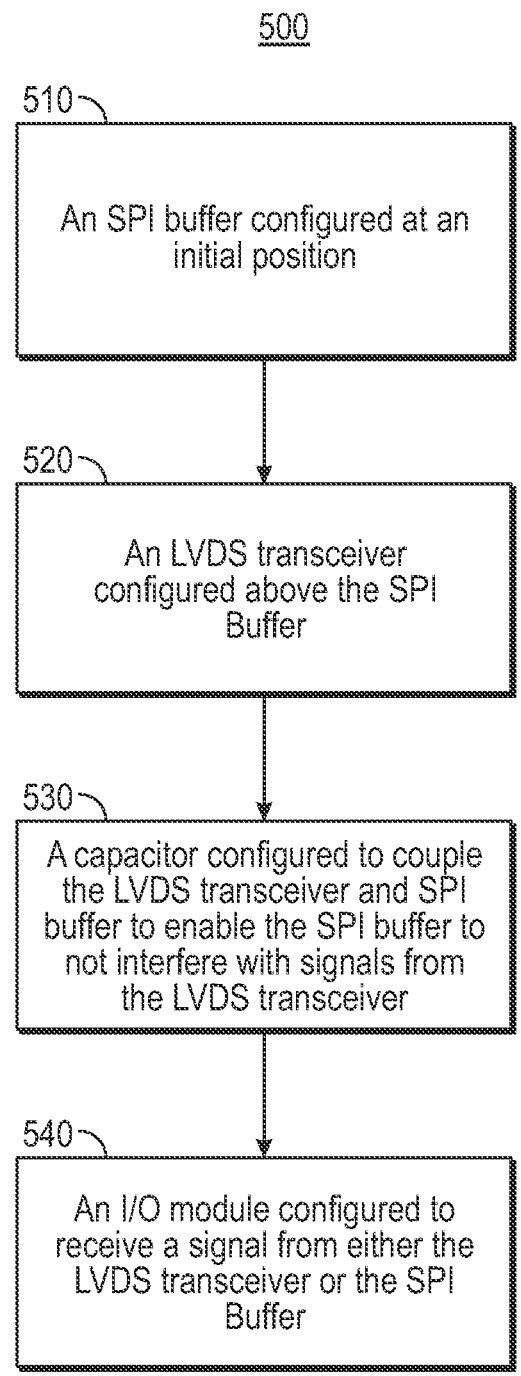
FIG. 5 illustrates a flow chart in accordance with an embodiment of the invention.

With respect to FIG. 5, a process 500 is illustrated in which a capacitor couples the SPI buffer and LVDS transceiver on the same interface with an FGPA and connector. As such, no signal from the LVDS is affected by the SPI buffer, and no signal from the SPI buffer is affected by the INDS transceiver. The SPI buffer can transmit a low-speed single ended signal while the LVDS transceiver can transmit a high-speed differential signal.

In FIG. 5, at step 510, an SPI buffer is configured at an initial position. The SPI buffer can transmit a low-speed single end signal. When the SPI buffer is enabled, the controller will disable the LVDS transceiver so that a signal from SPI buffer is not affected by a signal from the INDS transceiver.

Referring to FIG. 5, at step 520, an LVDS transceiver is positioned above the SPI buffer. The capacitor in the interface will couple the LVDS transceiver to the SPI buffer. The LVDS transceiver will transmit a high-speed differential signal when it is enabled. The controller will disable the SPI buffer when the LVDS transceiver transmits the high-speed differential signal. The capacitor will ensure that no signals from the LVDS transceiver affect the SPI buffer.

In FIG. 5, at step 530, the capacitor in the interface is configured to couple the LVDS transceiver to the SRI buffer, The capacitor will ensure that the SPI buffer will not interfere with signals from the LVDS transceiver when the LVDS is enabled by the controller and the SPI buffer is disabled. Similarly, when the SPI buffer is enabled, the capacitor will ensure that no signals from the LVDS will interfere or damage the SPI buffer.

Referring to FIG. 5, at step 540, an I/O module is configured to receive a signal from either the LVDS transceiver or the SPI buffer. The controller communicates with the I/O module with either the low-speed signal from the SPI buffer or the high-speed differential signal from the LVDS transceiver. The I/O module will be an old module that is inserted with an MCU and SPI Buffer when the controller communicates with the I/O module with the SPI signal. In contrast, the I/O module will be a new module with an FGPA, capacitor and LVDS transceiver when the controller communicates with the I/O module with a high-speed differential Those skilled in the art will appreciate that the example embodiments are non-exhaustive and that embodiments other than that described here may be included without departing from the scope and spirit of the presently disclosed embodiments.

Advantages/Summary

Overall, an LVDS transceiver can be coupled with the SPI buffer by a small value capacitor. When an LVDS high-speed differential signal is used, the signal passes through the small capacitor to the LVDS receiver on the I/O module. No signal from the SPI buffer will affect the LVDS transceiver, and the LVDS transceiver will not affect the SPI buffer. In addition, the controller will also disable the SPI buffer to ensure that no signals from the SPI buffer will affect the high-speed differential signal form the INDS transceiver.

In contrast, the controller can also disable the ENDS transceiver to enable the low-speed signal from the SPI buffer to pass. In this embodiment, the SPI signal will not affect the LVDS transceiver, nor will any signals from the LVDS transceiver affect the SPI signal. The signal from the SPI buffer will pass onto the I/O module, which will be an old module that will include the SPI buffer and MCU.

A backplane can include differential wiring. The backplane can be configured between the controller and the I/O module. SPI traces are routed into differential pairs. The differential pairs will guarantee the LVDS signal quality to the greatest extent. The differential pairs are also compatible with any SPI signal transmission. As such, the differential pairs on the backplane ensure that the signal successfully reaches the I/O module whether it is the high-speed differential signal from the LVDS transceiver or the low-speed single end signal from the SPI buffer.

The controller will communicate with the I/O module with either the SPI signal or the high-speed differential signal from the LVDS transceiver. When the SPI signal is used, the I/O module is an old module that will include an MCU and an SPI buffer. The SPI signal will be received by the old I/O module. Accordingly, the controller communicates with the old I/O module using the SPI signal. The LVDS transceiver will be disabled when the controller communicates with the old I/O module using the SPI signal.

In another embodiment, the controller will communicate with the I/O module using the high-speed differential signal from the LVDS transceiver. The I/O module will be the new I/O module including the LVDS transceiver and FPGA. The controller will communicate with the new I/O module using the high-speed differential signal. The controller will disable the SPI buffer to communicate with the new I/O module using the high-speed differential signal.

Conclusion

All references, including granted patents and patent application publications, referred herein are incorporated herein by reference in their entirety.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Various aspects of the invention have been described above by way of illustration, and the specific embodiments disclosed are not intended to limit the invention to the particular forms disclosed. The particular implementation of the system provided thereof may vary depending upon the particular context or application. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

The corresponding structures, materials, acts, and equivalents of all means or step plus function elements in the claims below are intended to include any structure, material, or act for performing the function in combination with other claimed elements as specifically claimed.

What is claimed is:

1. A system comprising:
    a controller comprising a connector and an interface;
    a serial peripheral interface (SPI) buffer provided at a first position in the controller and coupled to the connector;
    a low voltage differential signaling (LVDS) transceiver provided at a second position proximal the first position, the LVDS transceiver coupled to the connector;
    a capacitor configured to couple the LVDS transceiver and the SPI buffer to the same interface and the same connector, wherein the capacitor is configured to prevent an SPI buffer signal from interfering with an LVDS transceiver signal and prevent the LVDS transceiver signal from interfering with the SPI buffer signal; and
    wherein the controller is configured to selectively enable either the SPI buffer or the LVDS transceiver for transmitting and receiving signals via the connector.

2. The system of claim 1, wherein the SPI buffer provides a low-speed single end signal.

3. The system of claim 1, wherein the capacitor prevents a signal from the SPI buffer to damage the LVDS transceiver.

4. The system of claim 1, further comprising:
    an input/output (I/O) module configured to receive a signal via a backplane, the signal selectively transmitted from either the LVDS transceiver or the SPI buffer, wherein the controller communicates with the I/O module using the SPI signal.

5. The system of claim 1, further comprising:
a backplane comprising a plurality of traces, wherein the plurality of traces are coupled to the connector and provided as a group routed in the form of differential pairs.

6. The system of claim 1, wherein the capacitor is a pair of capacitors coupling the LVDS transceiver trace pairs to the connector.

7. The system of claim 1, wherein the capacitance of the capacitor is selected to allow the LVDS signal to directly pass through the capacitor while preventing the SPI buffer signal from being transmitted to the LVDS transceiver.

8. A system comprising:
a controller comprising a connector and an interface;
a low voltage differential signaling (LVDS) transceiver provided at a first position in the controller and coupled to the connector;
a serial peripheral interface (SPI) buffer provided at a second position proximal the first position, the SPI buffer coupled to the connector;
a capacitor configured to couple the LVDS transceiver and the SPI buffer to the same interface and the same connector, wherein the capacitor is configured to prevent an LVDS transceiver signal from interfering with an SPI buffer signal, and prevent an SPI buffer signal from reaching the LDVS transceiver; and
wherein the controller is configured to selectively enable either the SPI buffer or the LVDS transceiver for transmitting and receiving signals via the connector.

9. The system of claim 8, wherein the LVDS transceiver provides a high-speed differential signal.

10. The system of claim 8, wherein the capacitor limits a voltage amplitude transmitted by the SPI signal to the LVDS transceiver.

11. The system of claim 8, wherein the controller prevents the SPI buffer and the LDVS transceiver from transmitting a signal simultaneously to the I/O module.

12. The system of claim 8, further comprising:
an input/output (I/O) module configured to receive a signal via a backplane, the signal selectively transmitted from either the LVDS transceiver or the SPI buffer, wherein the controller communicates with the I/O module using the SPI signal.

13. A method comprising:
providing a controller comprising a connector and an interface;
positioning a serial peripheral interface (SPI) buffer at a first position in the controller, the SPI buffer coupled to the connector;
positioning a low voltage differential signaling (LVDS) transceiver at a second position proximal the first position, the LVDS transceiver coupled to the connector;
providing a capacitor to couple the LVDS transceiver and the SPI buffer to the same interface and the same connector, wherein the capacitor is configured to prevent an SPI buffer signal from interfering with an LVDS transceiver signal and prevent the LVDS transceiver signal from interfering with the SPI buffer signal; and
wherein the controller is configured to selectively enable either the SPI buffer or the LVDS transceiver for transmitting and receiving signals via the connector.

14. The method of claim 13, further comprising:
wherein the controller is further configured to selectively disable the SPI buffer.

15. The method of claim 13, further comprising:
providing an input/output (I/O) module configured to receive a signal via a backplane, the signal selectively transmitted from either the LVDS transceiver or the SPI buffer, wherein the controller is configured to selectively disable the LVDS transceiver to communicate with the I/O module using a signal from the SPI buffer.

16. The method of claim 15, further comprising:
configuring the controller to communicate with a second I/O module by using a signal from the LVDS transceiver.

17. The method of claim 13, wherein the I/O module is a new I/O module.

18. The method of claim 13, further comprising:
configuring a backplane with differential pair wiring.

19. The system of claim 5, wherein when the controller selects the LVDS transceiver for transmitting and receiving signals via the connector, the LVDS signals are transmitted and received by the plurality of traces.

* * * * *